United States Patent [19]

Salyani et al.

[11] Patent Number: 4,896,539

[45] Date of Patent: Jan. 30, 1990

[54] SPRAY CALIBRATION DEVICE AND METHOD

[75] Inventors: Masoud Salyani, Winter Haven; Joseph W. Serdynski, Lakeland, both of Fla.

[73] Assignee: University of Florida, Gainesville, Fla.

[21] Appl. No.: 257,446

[22] Filed: Oct. 13, 1988

[51] Int. Cl.⁴ .................. G01F 13/00; G01F 25/00
[52] U.S. Cl. ........................... 73/861; 73/3; 73/197; 73/219; 73/215
[58] Field of Search ............ 73/861, 3, 219, 195, 73/197

[56] References Cited

U.S. PATENT DOCUMENTS

| | | | |
|---|---|---|---|
| 513,422 | 1/1894 | Rowland | 73/219 X |
| 2,810,606 | 10/1957 | Taylor | 299/46 |
| 3,001,397 | 9/1961 | Leonard . | |
| 3,078,714 | 2/1963 | Brown | 73/223 |
| 3,513,700 | 5/1970 | Wiesner et al. | 73/219 |
| 3,561,427 | 2/1971 | Profy | 73/219 X |
| 3,633,422 | 1/1972 | Grieshaber | 73/219 |
| 3,831,446 | 8/1974 | Dye . | |
| 3,859,854 | 1/1975 | Dye et al. | 73/215 |
| 3,922,913 | 12/1975 | Scott | 73/219 |
| 4,062,220 | 12/1977 | Taube et al. | 73/3 |
| 4,127,030 | 11/1978 | Martig, Jr. | 73/215 X |
| 4,206,767 | 6/1980 | Wingrove | 73/219 X |
| 4,213,336 | 7/1980 | Schweickart et al. | 73/215 |
| 4,395,918 | 8/1983 | Wilson | 73/861 |
| 4,409,845 | 10/1983 | Stufflebam et al. | 73/861 |
| 4,562,963 | 1/1986 | Claussen et al. | 137/559 |
| 4,663,960 | 5/1987 | Makkink | 73/3 |
| 4,723,437 | 2/1988 | McKenzie | 73/3 |

FOREIGN PATENT DOCUMENTS

| | | | |
|---|---|---|---|
| 559352 | 2/1975 | Switzerland | 73/219 |
| 605097 | 4/1978 | U.S.S.R. | 73/219 |
| 1015150 | 12/1965 | United Kingdom | 73/219 |
| 1507149 | 4/1978 | United Kingdom . | |

OTHER PUBLICATIONS

The McKenzie Calibrator, Sprayer Calibrator Corp., 2301 Research Blvd., Suite 204, Fort Collins, CO., 80526; 2 page brochure; Pub. by Dec. 1988.
Beline Manufacturing Co. Inc.; advertisement, p. 36 *Agrichemical Age*, Jan. 1988.
Hardi Incorporated, 477 Execter Road, London, Ont. Canada, N6E 2Z3; 2 page brochure; Pub. by Dec. 1988.

*Primary Examiner*—Tom Noland
*Attorney, Agent, or Firm*—Dennis P. Clarke

[57] ABSTRACT

A device for determining a flow rate of liquid discharged from a plurality of discharges comprising a plurality of collectors for the discharged liquid connected by a manifold having a plurality of inlet lines attached to the discharges and a single outlet line; a receptacle having at least a first and a second compartment, each of which has a predetermined fixed volume adapted to hold the liquid and each having a volume indicator associated with at least one liquid level in each of the compartments; a connector for the outlet line of the manifold to the receptacle and an attachment for selectively directing the liquid from the outlet line into each of the compartments.

15 Claims, 2 Drawing Sheets

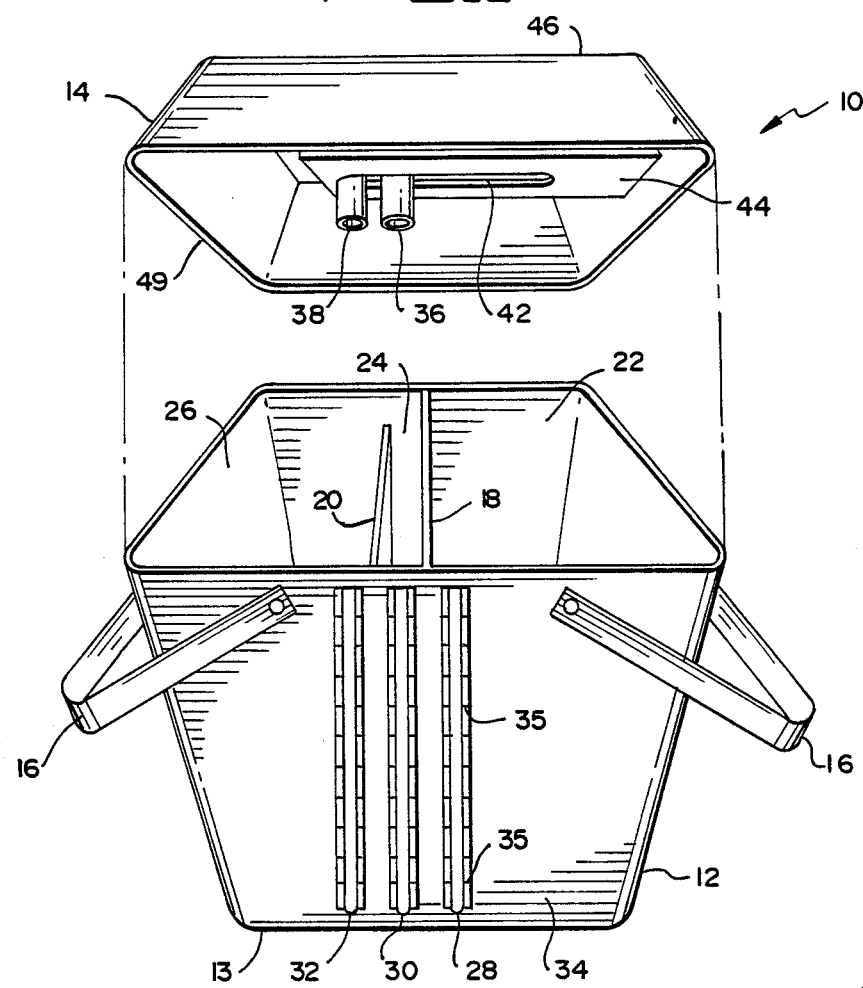
FIG_1
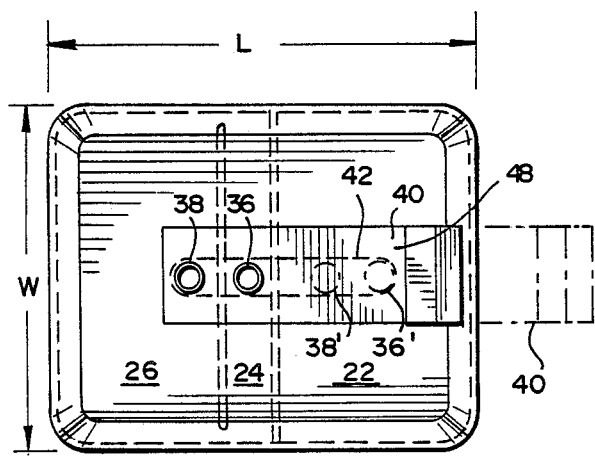
FIG_2
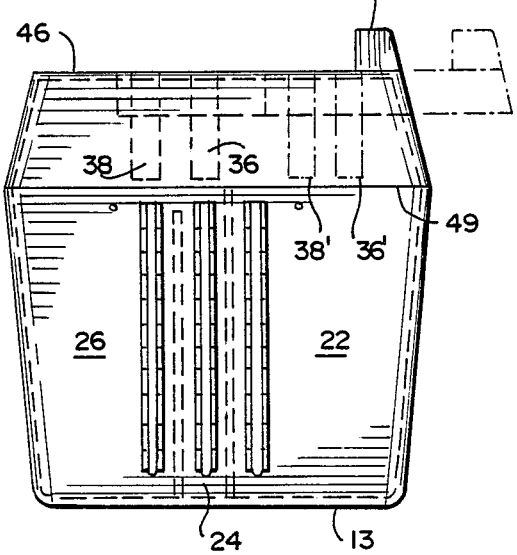
FIG_3

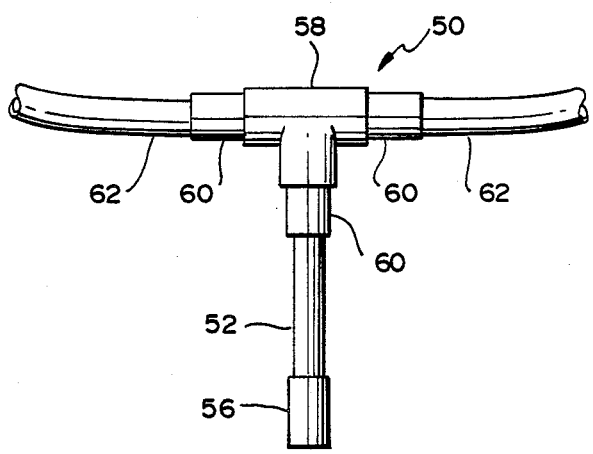
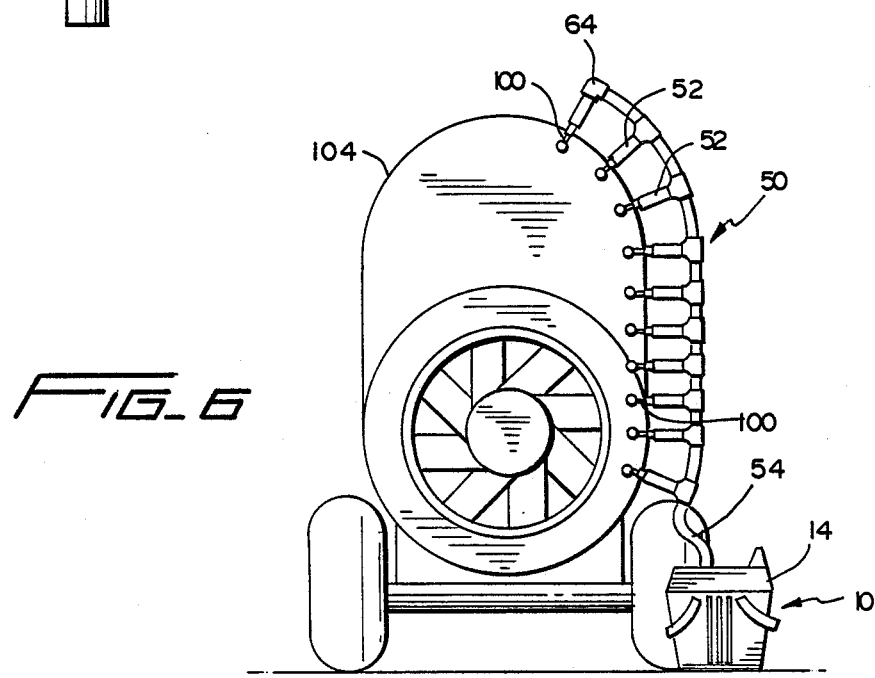
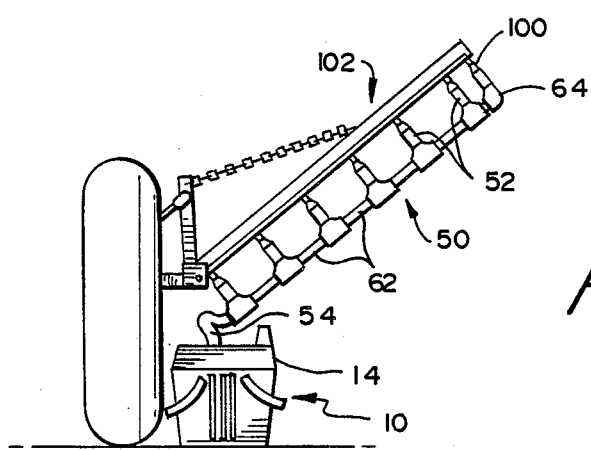

SPRAY CALIBRATION DEVICE AND METHOD

BACKGROUND OF THE INVENTION

1. Field of the Invention

The present invention relates to a method and device for use in calibrating a fluid flow rate from a single discharge nozzle or multiple discharge nozzles used in connection with fluid sprayers.

2. Description of Related Art

Fluid in particular, agricultural sprayers are commonly outfitted with equipment enabling a liquid discharge rate to be varied according to the particular type of spraying to be performed. For example, the flow rates employed in herbicide application are low, relative to volume orchard spraying, which would be considered as being in the medium flow rate range. Higher flow rates are employed, for example, in high volume citrus spraying. The agricultural sprayer equipment may have variable speed pumps, variable opening flow rate valves, and may have more than one set of nozzles which can be used to alter spraying parameters, such as pressure and speed, in order to permit adjustment of the sprayer to a desired liquid flow discharge rate.

Heretofore, various devices and methods have been used in measuring liquid flow rates of, and in calibrating the liquid discharge of, spray equipment. As used herein, with respect to spray equipment, the word "calibrate" refers to a measuring of a liquid flow rate and adjusting spraying parameters necessary to obtain the desired application rate. The spray calibrators or calibration devices referred to herein are generally designed to perform only the flow rate measurements to assist an operator in determining do not themselves have the capability to make such adjustments on the spraying equipment.

Particularly in the field of agricultural sprayers, the use of calibrating devices is desirable, and in some instances necessary, in order to avoid overspraying or underspraying a desired quantity of, for example, a pesticide or herbicide. Calibrating devices known in the agricultural spraying art have generally been designed to measure liquid flow from only a single nozzle. One disadvantage of such calibrators is that two common types of agricultural sprayers, the boom-type sprayer and the air-blast sprayer, discharge liquid simultaneously from a plurality of individual nozzles, which are likely to be discharging the liquid at slightly varying rates. The calibrators therefore are essentially unable to measure a total liquid discharge flow rate from all nozzles for use in calibrating the sprayer.

Spray calibrators are also known in which a receptacle is attached to a nozzle to collect the liquid discharged from that nozzle in a measured time period. The flow rate is determined by dividing the volume of liquid collected by the measured time to collect the liquid. An example of such a calibrator is shown in U.S. Pat. No. 4,409,845 to Stufflebam et al. Such calibrators suffer from the disadvantage that the erratic start-up liquid flow rate normally evidenced in spraying equipment is included in the calculation of the flow rate. The steady state flow rate, which is of more interest to the operator, cannot accurately be calculated by such a system.

Yet another drawback of some of the known calibrating devices is that the design of such calibrating devices does not allow recovery of the liquid discharged during calibration. In order to liquid discharged during calibration. In order to conserve more expensive liquids containing active ingredients, such calibrating devices are designed to use water as the liquid discharged and measured in the calibration process, and the pesticide or other liquid is not dispensed until actual operation. Such substitution of liquids may adversely impact the accuracy of the measurement and it is therefore desirable to use the actual liquid which is to be sprayed during operation for the calibration process as well.

Known calibration devices range from the relative complexity of computerized flow meters to the relative simiplicity of the plastic bag calibrator described in the Stufflebam patent. As indicated previously, these calibration devices are generally employed to measure liquid flow rate from a single nozzle and not from a multiple nozzle discharge. Further, devices such as that disclosed in the Stufflebam patent are generally not capable of measuring a steady state flow rate, in that a sprayer will generally not discharge fluid at the same rate during initial start-up as it will during the remainder of normal operation.

It is therefore a principal object of the present invention to provide a spray calibration device which is capable of measuring flow rate of actual liquid, and particularly a steady state flow rate, from an entire bank of nozzles situated on an agricultural sprayer, such as a boom sprayer.

It is a further object of the present invention to provide an inexpensive and easy-to-use spray calibration device for measuring a combined flow rate of a liquid discharged from a plurality of spray nozzles.

It is a further object of the present invention to provide a spray calibration device which is capable of measuring a liquid flow rate of a liquid discharge from either a plurality of nozzles or a single nozzle.

It is yet a further object of the present invention to provide a spray calibration device which permits recovery and reuse of the liquid sprayed during the calibration process.

Another object of the present invention is to provide a spray calibration device having a receptacle having at least one internal partition, the partition dividing the receptacle into at least two compartments, and further having a means for selectively directing the liquid collected into the two compartments.

It is yet another object of the present invention to provide a manifold assembly having a plurality of tubes extending therefrom for connection to a plurality of spray nozzles, the manifold further having an outlet tube for attachment to an inlet port on a liquid collection receptacle.

SUMMARY OF THE INVENTION

The above and other objects of the present invention are accomplished by providing a partitioned calibration receptacle having at least one partition therein dividing the receptacle into at least a first and second compartment, means for selectively directing the liquid discharged from a plurality of liquid discharge means, such as a plurality of nozzles of a sprayer, into at least the first and second compartments of the receptacle. The receptacle is provided with at least one marking indicating a volume associated with at least one liquid level in each separate compartment of the receptacle by which a liquid level or volume may be determined. Additionally, a manifold member is provided which has a plurality of inlet lines and only a single outlet line, the inlet lines having connectors for enabling attachment to each of the liquid discharge means of the sprayer, and means for connecting the outlet line of the header to the calibration receptacle.

Measurement of the liquid flow rate of the sprayer for use in calibrating the sprayer is accomplished in the present invention by collecting the liquid discharged from the nozzles in the manifold and directing the liquid into a compartment in the calibration receptacle. The flow rate is calculated by determining the volume of liquid collected in the compartment and dividing this volume by an elapsed time measured in collecting the liquid in the compartment. Once a flow rate has been calculated, a sprayer operator may adjust spraying parameters, such as pressure and speed, in order to arrive at the desired flow rate for the spraying process. The flow rate measurement may be repeated until the desired rate is achieved. Adjustment of the spraying parameters may include valving or pump adjustments, as well as adjusting or changing nozzles.

The calibration device of the present invention provides several advantages over known spray calibrators. The manifold of the present device is advantageously used to obtain a total sprayer flow rate from essentially any number of nozzles of the sprayer which are discharging liquid. Further, the calibration receptacle is of a design which permits the measurement of a steady state flow rate, and substantially eliminates the inaccuracies introduced into such a measurement which result from including the initial or start-up liquid discharge volume (and elapsed time) in the flow rate measurement. This initial liquid discharge is often erratic and will not generally permit an accurate calculation of liquid flow rate by a volume-time measurement system.

The calibration receptacle of the present invention includes at least one partition which creates at least two internal compartments into which liquid may be directed. The receptacle further has a means for selectively directing the flow of liquid into the internal compartments. The steady state flow rate of the sprayer is accurately measured by directing the initial flow of liquid into one of the compartments until the operator determines that the liquid flow has attained a steady rate. The operator then employs the directing means to direct the liquid into the second compartment and a time measurement is commenced. The directing means is subsequently moved back to its original position, the time measurement is stopped, and the sprayer control valves are then closed. The volume of the liquid in the second compartment and the elapsed time are then used in making the flow rate calculation.

The calibration receptacle of the present invention advantageously has two internal partitions which create three internal compartments having different, predetermined volumes. These three compartments are serviced by two moveable inlet ports extending through the lid of the receptacle. The three compartments of different volumes permit more accurate measurement of flow rates which range from low to high rate, depending on the desired rate for a particular spraying task. The receptacle allows an operator to select the most appropriately sized compartment for the measurement, and one of the other two compartments may then serve as the compartment into which the initial liquid flow and the post-measurement liquid flow will be deposited.

The device of the present invention has a further advantage in that the actual liquid to be used in the spraying operation is used in the calibration process without expending any of the liquid. The liquid collected in the receptacle is easily poured back into the sprayer tank, and thus repeated measurements may be made, where necessary, without the loss of costly liquid spray products. The device is also lightweight and highly portable and therefore may be easily moved into close proximity to the sprayer or sprayers.

BRIEF DESCRIPTION OF THE DRAWINGS

These and other features of the present invention and the attendant advantages will be readily apparent to those having ordinary skill in the art and the invention will be more easily understood from the following detailed description of the preferred embodiments of the present invention taken in conjunction with the accompanying drawings wherein like reference characters represent like parts throughout the several views, and wherein:

FIG. 1 is a perspective view of the calibration receptacle of the present invention;

FIG. 2 is a top plan view of the calibration receptacle of the present invention with the lid in place;

FIG. 3 is a front elevation view of the calibration receptacle of the present invention;

FIG. 4 is an exploded view of a portion of the manifold of the present invention;

FIG. 5 is a substantially schematic representation of the calibration receptacle and manifold of the present invention in use on an agricultural boom sprayer;

FIG. 6 is a substantially schematic representation of the calibration receptacle and manifold of the present invention in use on an agricultural airblast sprayer.

DETAILED DESCRIPTION OF THE PREFERRED EMBODIMENT

Referring initially to FIG. 1, the calibration receptacle of the spray calibrator according to a preferred embodiment of the present invention is indicated generally at numeral 10. Calibration receptacle 10 comprises two main portions, a tank or bucket 12 and an associated lid 14. The bucket 12 is preferably substantially rectangular or square at its base 13 and in plan view cross-section, however, the bucket 12 may be constructed in nearly any conceivable cross-section geometry. Bucket 12 has a pair of straps or handles 16 which facilitate the handling of the bucket both while empty and when filled with liquid discharged from a sprayer after a measurement has been performed.

Bucket 12 is partitioned internally to create at least a first and second compartment, for reasons which will become evident in the later discussion of the operation of the spray calibrator system. While the bucket 12 requires only two compartments to perform the accurate steady state flow rate measurement in the present invention, the bucket 12 preferably contains first and second internal partitions 18, 20 which extend completely across a width W (FIG. 2) of the bucket 12, partition 20 preferably being lower than partition 18, and create, in the interior of the bucket, three separate compartments 22, 24, 26. These three compartments will have known volumes, and each preferably has a volume different from the others. The bucket 12 having three compartments is more versatile than a bucket having two compartments in that more accurate flow rate measurements may be made. As depicted, compartment 22 preferably has a larger volume than compartments 24 and 26, and will preferably comprise substantially one-half of the total bucket volume. Partition 18 thus extends across the width W of bucket 12 at substantially the midpoint of the length L (FIG. 2) of the bucket 12.

Partition 20 separates the remaining one-half volume of the bucket 12 into small compartment 24 and medium compartment 26. The volume of medium compartment 26 may preferably comprise approximately 40% of the total bucket volume, the small compartment 24 thus comprising approximately 10% of the total bucket volume.

The bucket 12 is provided with sealed openings containing transparent sight gauges 28, 30, 32 extending vertically along the front wall 34 of the bucket. One sight gauge is provided for each internal compartment, and thus large compartment 22 has an associated sight gauge 28 disposed on a portion of the front wall 34 which is adjacent to that compartment. In a like manner, small compartment 24 has sight gauge 30 associated therewith extending along a portion of front wall 34 adjacent thereto, and medium compartment 26 has associated sight gauge 32 extending along an adjacent portion of front wall 34.

The sight gauges 28, 30, 32 are made of a transparent material, such as glass or a transparent polymeric material compatible for use with the chemicals commonly employed in agricultural sprayers. The sight gauges 28, 30, 32 further have indicia 35 either integrally embossed in the sight gauges or, preferably disposed on the exterior wall of the bucket 12, immediately adjacent each of sight gauges 28, 30, 32, as shown in FIG. 1. The indicia or markings 35 are provided to allow direct readings of liquid volumes in the compartments based on given liquid levels and are positioned vertically along each sight gauge at appropriate increments. As each of the three compartments 22, 24, 26 have different volumes, a different set of liquid level indicia 35 will be required for each sight gauge. Preferably, although not shown in such detail, each sight gauge will be graduated in both metric and U.S. customary units, thereby facilitating flow rate calculations in either system.

The lid 14 associated with bucket 12 preferably contains two longitudinally spaced inlet ports 36, 38 extending through a slide bar 40, (FIG. 2) and also through an elongated oval slot 42 in the top of lid 14 when slide bar 40 is positioned in a slide channel 44 (FIG. 1) on the top surface 46 of lid 14. Slide channel 44, as depicted, comprises a rectangular depression formed in the top surface 46 of lid 14, and extends lengthwise from an edge of the lid 14, spanning the entire length of compartments 22 and 24 and extending over a portion of compartment 26. Oval slot 42 having inlet ports 36, 38 extending therethrough is sized to permit the inlet ports to be moved from, at a first extreme a position wherein both inlet ports 36, 38 are disposed above large compartment 22, to, at a second extreme, a position wherein inlet port 36 is disposed above small compartment 24 and inlet port 38 is disposed above medium compartment 26. This can best be seen in FIG. 2, and for ease of reference, the first extreme will be referred to as an "outer limit" of movement of the slide bar 40 and the second extreme will be referred to as an "inner limit" of movement.

Slide bar 40 is preferably configured to fit snugly in the slide channel 44 in lid 14, preventing inadvertent relative sliding movement while at the same time has sufficient freedom of movement to permit an operator to move slide bar 40 with one hand. Slide bar 40 is provided with a grip 48 (FIGS. 2,3) at one end in order to assist the operator in moving the slide bar 40 relative to slide channel 44.

Inlet ports 36, 38 are preferably short hollow tube-like elements which, as best seen in FIG. 3 extend from a top of slide bar 40 through opening 42, and which terminate slightly above the lower lip 49 of the lid 14. Thus, inlet ports 36, 38, which in operation will be moved from certain positions above predetermined compartments to other positions above other predetermined compartments, will not be interfered with or impeded by partitions 18, 20, when moving between positions.

Turning now to FIGS. 4, 5, 6, the liquid collecting apparatus, which enables a total liquid flow rate from a plurality of discharge nozzles 100 to be calculated, will be described in detail. A manifold 50 is provided having a plurality of inlet lines 52 and a single common outlet line 54. Manifold 50 is actually constructed from sections of polymeric tubing, pipe, and pipe joints. As seen in the exploded view of FIG. 4, a nozzle connector 56 is provided at the extremity of each of inlet lines 52. The nozzle connectors 56 are required to engage nozzles 100, shown schematically in FIGS. 5 and 6, in a substantially fluid-tight manner. Preferably nozzle connectors 56 are constructed of a stretchable tubing having a substantial amount of elasticity or shape memory. Inlet lines 52 are preferably constructed of an elongated section of vinyl tubing extending between nozzle connector 56 and manifold 50.

Manifold 50 preferably comprises a plurality of PVC (polyvinylchloride) tee sections 58 having short PVC pipe stubs 60 extending from each of the three openings in the tee 58. The manifold 50 further has vinyl tubing sections 62 extending between tee sections 58, and bonded to pipe stubs 60 at the tee sections. As can be seen in FIG. 5, which shows the manifold in position with a boom 102 of discharge nozzles 100, the manifold tubing sections 62 will be of a length sufficient to span between tee sections 58 when the inlet lines 52 are connected to the nozzles 100. The inlet lines 52 are sealingly engaged to the pipe stub 60 extending normal to the in-line tee openings.

It will be recognized that, at one end of manifold 50, a tee section 58 will not be required, as there will be no upstream nozzles from which fluid must be collected. At this end of manifold 50, a PVC elbow 64 may be used in place of a tee section 58 to join that inlet line 52 into the manifold 50. Alternatively, a tee section 58 may be used provided that one of the openings is blocked off such that the coupling functions in the same manner as an elbow 64. At the downstream end of manifold 50, a flexible manifold outlet line 54 is provided, the outlet line 54 being adapted to be removably inserted into to one of the inlet ports 36, 38 on lid 14 of receptacle 10.

Two common types of agricultural sprayers are depicted in FIGS. 5 and 6, these being the boom sprayer 102 and the airblast sprayer 104. Each type of sprayer has a plurality of nozzles 100 used to spray a liquid onto an agricultural crop. The flexibility and adaptability of the nozzle connectors 56 and manifold 50 permit the use of this spray calibrator with virtually any kind of sprayer. It may, however, be desirable to construct a manifold 50 for use with specific sprayer units, especially if the sprayer unit employs nozzles of an unusual size or an unusual nozzle arrangement. For common agricultural sprayers, the inlet lines 52 and manifold tubing and pipe joints are preferably constructed using one inch (1") nominal internal diameter (ID) sizes.

In operation, calibration of a liquid flow rate is accomplished by the spray calibrator of the present invention by first connecting the inlet lines 52 of the manifold 50 to each nozzle 100 of a sprayer 102, 104 to be included in a flow rate measurement. The outlet line 54 of the manifold 50 is connected to receptacle 10 by inserting the line 54 to one of inlet ports 36, 38.

The generalized sequence and procedure for obtaining a liquid flow rate measurement according to the present invention will now be described. It should be recognized that, although the preferred embodiment of the invention has a bucket 12 having three compartments 22, 24, 26 and a lid having two inlet ports the invention is not intended to be so limited. The improved accuracy and ability to obtain measurements of steady state flow rates; as well as to obtain total flow rates from a plurality of nozzles, may be achieved by a receptacle or bucket having only two compartments which are serviced by only one directing means or inlet port. However, because the three compartment construction of the preferred embodiment provides more versatility this construction will form the basis for the ensuing discussion.

The selected inlet port 36, 38 on the lid 14 of bucket 12 is positioned to direct the liquid collected in the manifold 50 into a first compartment, the sprayer is started and a control valve on the sprayer(s) 102, 104 is opened. The liquid initially flowing from the nozzles 100 through the manifold 50 and into the bucket 12 will generally yield an erratic flow and a lower overall flow rate than the actual steady state rate, as air must be displaced in the various lines and the start up of the liquid discharge may introduce other flow irregularites initially.

Once an operator has determined that the flow has reached steady state (by, e.g.) disappearance of spurts of liquid) the selected receptacle inlet port is moved into a position to direct the liquid into a second one of the compartments 22, 24, 26. At this time, a stopwatch or other timing device is started and the liquid is collected in this second compartment for a period of time to obtain a measurable amount of liquid in the second compartment. The inlet port is subsequently moved back to its initial position to direct the fluid once again into the first compartment, and the timing device is stopped at the moment the inlet port is repositioned. The sprayer flow control valve(s) is then closed, thereby stopping the liquid discharge from the nozzles 100.

The volume of the fluid present in the second compartment is determined from reading the sight gauge associated with the second compartment, and a flow rate is calculated by dividing this volume by the elapsed time measured by the stopwatch, or other timing device employed.

This general explanation of the operation of the spray calibrator 10 of the present invention can be elaborated upon in order to show the advantages and versatility of providing a bucket 12 with three compartments 22, 24, 26 of different volumes as the calibration receptacle. Additionally, the selection of the inlet ports 36, 38 and positioning of the slide bar 40 in measuring various flow rates will be discussed in further detail.

As indicated previously, the three compartments 22, 24, 26 of bucket 12 preferably have volumes on the order of 50%, 10% and 40%, respectively, of the total bucket volume. As can best be seen from viewing FIG. 3, it is evident that a given volume of liquid would fill much more of compartment 24 than would the same liquid volume in either of compartments 22 and 26.

Thus, as one of ordinary skill in the art might imagine, measurement of relatively low liquid flow rates would most easily be performed using compartment 24, in terms of the time required to obtain a readily measurable amount of liquid in the compartment 24. The highest flow rates might, however, quickly overflow either of compartments 24 and 26 before the operator is able to perform all of his required operations, and thus the highest flow rates are best measured using compartment 22 to collect the measurable fluid. For medium or moderate flow rates, it should be apparent that compartment 26 would yield the most advantageous reading, as compartment 24 would likely be too small and fill up too quickly, and compartment 22 would likely fill up too slowly.

The position of the inlet ports 36, 38 on slide bar 40, and the design of slide channel 44 containing slot 42 contribute to the ease of use of the calibration receptacle. Referring now back to FIGS. 1 and 2, it can be seen that the extent of lengthwise travel of slide bar 40 and inlet ports 36, 38 is governed by slot 42. FIGS. 2 and 3 show slide bar 40 at the two limits of travel thus governed, the "inner" limit depicted in solid lines in FIG. 2, and the "outer" limit shown in broken lines. It is preferred that, at the inner limit, inlet port 36' is positioned over small compartment 24, and inlet port 38' is positioned over medium compartment 26. Further, it is preferred that, at the outer limit of slide bar 40, both of inlet ports 36 and 38 will be disposed above large compartment 22. Such a configuration permits the ports to be readily positioned over the desired measurement compartment for flow rate measurement. In order to measure low flow rates, e.g., herbicide application the manifold outlet line 54 is inserted into inlet port 36. The slide bar 40 is pulled to the outer limit, wherein port 36 will be disposed above compartment 22. The operator will start the valve or valves. The liquid discharged from the nozzles 100 on the sprayer will discharge into large compartment 22. When the operator determines that a steady state flow rate has been attained, the operator moves slide bar 40 to its inner limit, which positions inlet port 36 over small compartment 24, and directs the liquid from manifold 50 into that compartment. At the same time that the operator is shifting slide bar 40, the operator will start a stopwatch or other timing mechanism. The operator then observes the sight gauge for compartment 24, and after enough liquid (a measurable quantity) is collected, the operator shifts slide bar 40 back to its outer limit, stops the watch, and turns off the control valve or valves of the sprayer. It can thus be seen that both the start up liquid and the "post-measurement" liquid discharged by the nozzles are directed into compartment 22, and only a steady state flow portion of the liquid is directed into small compartment 24.

The flow rate is calculated by obtaining a volume reading from the markings or indicia 35 associated with sight glass 30 associated with compartment 24, and dividing that volume by the time as measured by the stopwatch. Adjustment of spraying parameters, if necessary, may then be effectuated, and the calibration process repeated until a proper flow rate is attained.

For medium range flow rates, e.g., low volume orchard spraying, the manifold outlet line 54 is connected to inlet port 38, and the slide bar is initially positioned at its outer limit, inlet port 38 being disposed to direct liquid into large compartment 22. A similar procedure is followed in that the sprayer control valves are opened, liquid is directed into compartment 22 until steady state flow is attained, and slide bar 40 is moved by the operator to its inner limit position. In this instance, inlet port 38 winds up in a position wherein it will direct liquid into medium compartment 26. The timer is started with the movement of slide bar 40 and is then stopped when slide bar 40 is returned to its original, outer limit, position. The volume of liquid in medium compartment 26 and the elapsed time measured are used to calculate the flow rate, and again the operator will make necessary adjustments and repeat the calibration procedure.

High flow rates are measured by connecting manifold outlet line 54 to either of outlet ports 36, 38. Particularly where high total flow rates are employed, the number of nozzles from which liquid is to be collected may be large enough in number that it is preferable to use two manifolds to collect the dispensed liquid. In such a case, a second manifold outlet line (not shown) would be connected to the remaining inlet port (36 or 38). The slide bar 40 is initially positioned at its inner limit in this case, the port or ports thereby disposed to direct liquid into the small and medium compartments 24, 26. Once steady state flow is attained, slide bar 40 is shifted to its outer limit, whereupon inlet ports 36 and 38 will be disposed to direct liquid from the manifold 50 into large compartment 22. Again, a time measurement is started when this shift occurs. The time measurement is stopped when slide bar 40 is shifted back to its inner limit position once a sufficient amount of liquid is collected in compartment 22 for the volume measurement and flow rate calculation.

It can be seen that the design of the bucket 12 and compartments and inlet ports greatly facilitates measurement of a wide range of total flow rates. Once the appropriate inlet port 36, 38 is selected and the appropriate initial slide bar position (i.e., inner limit or outer limit of movement) is determined, the required shifting of the slide bar 40 by the operator is between only the initial limit and the opposite limit. The proper alignment of the ports over the appropriate compartments is taken care of by the slide bar 40 and slide channel 44 design.

The spray calibration receptacle of the present invention may also advantageously be used to calculate the liquid flow rate for any single nozzle of a multiple nozzle sprayer, without loss of any of the pesticide or other spraying fluid being used. The procedure for measuring a single nozzle flow rate involves connecting the nozzle whose flow rate is to be measured to inlet port 38. This may be accomplished by using a header such as header 50, but will more advantageously employ a single run of 1" ID vinyl tubing (not shown) having a stretchable nozzle connector at one end, and at its other end will be adapted to be inserted into port 38 in a manner similar to the manifold outlet line-to-port connection. The remaining nozzles of the boom sprayer, airblast sprayer or other multiple nozzle configuration are connected to a manifold 50, the outlet line 54 of which is connected to receptacle inlet port 36.

The slide bar 40 is initially positioned at its outer limit position, thereby positioning both of inlet ports 36, 38 over large compartment 22. The sprayer is started up, the control valve or valves opened, and the discharged liquid is directed into large compartment 22 from both of ports 36, 38. When the operator has determined that steady state flow has been attained, the operator will move slide bar 40 to a position at which inlet port 38 is above small compartment 24 and inlet port 36 is above large compartment 22. The proper positioning of the slide bar in this instance will require the operator to align port 38 over compartment 24, however, this may be facilitated by placing a mark or stripe on the lid 14 indicating this intermediate position for slide bar 40. In such a position, inlet port 38 will direct the liquid discharged from the single nozzle into small compartment 24, while the liquid discharged from the remaining nozzles continues to be directed into large compartment 22. As with the previously discussed procedures, an elapsed time measurement is commenced by the operator when the operator moves inlet port 38 over small compartment 24. The time measurement is stopped when the operator moves slide bar 40 back to its initial, outer limit position, and the sprayer control valve or valves are then closed.

A volume reading may then be taken from the sight gauge 30 associated with the small compartment 24, this volume being divided by the measured elapsed time to obtain the liquid flow rate of the single nozzle. As all of the liquid discharged from all of the nozzles is collected in bucket 12, either in small compartment 24 or large compartment 22, no waste, or spillage of the sprayed liquid is experienced. The collected liquid may be returned to the sprayer tank, and the procedure repeated as necessary.

The bucket 12 is to be appropriately sized such that a range of flow rates normally used in a particular setting may be measured. As an example, it may be preferred for agricultural spraying to have the bucket be large enough to be capable of handling and measuring flow rates of up to 76 liters/minute, or 20 gallons/minute. It is to be recognized, however, that larger or smaller buckets may be provided as required for situations where the 20 gallon/minute maximum rate is either too low or too high. The bucket 12 and lid 14 may be manufactured of a fiber-reinforced plastic, or by other plastics which are suitable for injection molding and mass production. The various manifold components may also be made of materials which are susceptible of mass manufacture.

Although specific details, components and elements have been identified in the foregoing description of the preferred embodiment, it is to be appreciated that these are for illustrative purposes only. Numerous modifications and adaptations may readily become apparent to those skilled in the art. Accordingly, the scope of the present invention is to be determined by reference to the appended claims.

What is claimed is:

1. A device for use in determining a flow rate of liquid discharged from a plurality of liquid discharge means comprising:
   means for collecting said discharged liquid, said collecting means comprising a plurality of connectors adapted to engage each of said plurality of liquid discharge means in a substantially fluid-tight manner, and a manifold having a plurality of inlet lines and a single outlet line, each of said inlet lines having one of said connectors attached thereto,
   a receptacle having at least a first and a second compartment, each of said first and second compartments having a predetermined fixed volume adapted to hold said liquid, each of said compartments further having means for indicating a volume associated with at least one liquid level in each of said compartments;

means for connecting said outlet line of said manifold to said receptacle; and means for selectively directing said liquid from said outlet line into each of said compartments.

2. A device as defined in claim 1 further comprising a lid adapted to engage a top portion of said receptacle, wherein said connecting means comprises at least a first inlet port having an opening extending through said lid, said first inlet port being adapted to connect to said outlet line of said manifold.

3. A device as defined in claim 2 wherein said means for selectively directing said liquid comprises a slide bar disposed to slide on said lid, said inlet port being disposed on and carried by said slide bar, said slide bar being adapted to move said inlet port into a first position above said first compartment and into a second position above said second compartment.

4. A device as defined in claim 3 wherein said receptacle has at least a first partition extending across a width of said receptacle, said partition having a height substantially equal to a height of said receptacle, said partition dividing said receptacle into said first and second compartments.

5. A device as defined in claim 4 wherein said indicating means in each of said compartments comprises a transparent sight gauge disposed on a wall of said receptacle, each of said sight gauges having associated compartment volume indicia adjacent thereto, said sight gauges being adapted to be read from an exterior of said receptacle.

6. A device as defined in claim 5 wherein each of said sight gauges extends along a wall of said receptacle adjacent to an associated compartment.

7. A device as defined in claim 6 wherein said first and second compartments are of different volumes, said compartments thereby having different liquid holding capacities.

8. A device for use in measuring a liquid flow rate comprising:

a receptacle having at least a first, second, and a third compartment therein, each of said compartments having different predetermined fixed volumes adapted to hold said liquid, said receptacle having a base which is substantially rectangular in shape and first and second internal partitions of different height extending across a width of said receptacle, said partitions dividing said receptacle into said first, second and third compartments;

port means disposed above said receptacle for receiving said liquid to be measured and for selectively directing a liquid into each of said first, second, and third compartments;

indicating means for visually determining a volume of liquid contained in each of said first and second compartments;

a lid adapted to cover said receptacle, said lid further comprising a slide bar having said port means disposed therein, said slide bar being adapted to be moved relative to said lid and said receptacle within a slide channel on said lid in a lengthwise direction.

9. A device as defined in claim 5 wherein said port means comprises a first and a second inlet port disposed on said slide bar, each of said first and second ports having an opening extending through said slide bar and said lid.

10. A device as defined in claim 9 wherein said lid further comprises means for limiting an extent of movement of said slide bar between an inner limit and an outer limit relative to said receptacle.

11. A device as defined in claim 10 wherein said first and second inlet ports are disposed on said slide bar at predetermined positions wherein both of said first and second inlet ports are disposed above said first compartment when said slide bar is positioned at said outer limit of movement, and wherein said first inlet port is disposed above said second compartment and said second inlet port is disposed above said third compartment when said slide bar is positioned at said inner limit of movement.

12. A device as defined in claim 10 wherein said first compartment comprises approximately 50% of a total receptacle volume, said second compartment comprises approximately 10% of said total receptacle volume, and said third compartment comprises approximately 40% of said total receptacle volume.

13. A device as defined in claim 8, further comprising a manifold having a plurality of connectors adapted to engage a plurality of liquid discharge means in a substantially fluid-tight manner, said manifold further having a single outlet line adapted to engage said port means of said receptacle.

14. A device as defined in claim 13 wherein said manifold further comprises a plurality of aligned tee sections connected to one another by sections of flexible tubing, further having an inlet section of flexible tubing extending perpendicularly outwardly therefrom, said inlet tubing having a connector disposed on a free end thereof, said connector being constructed of an elastically stretchable material.

15. A device as defined in claim 14 wherein said manifold outlet line comprises a section of flexible tubing attached to a tee section at one end of said manifold.

* * * * *

UNITED STATES PATENT AND TRADEMARK OFFICE
CERTIFICATE OF CORRECTION

PATENT NO. : 4,896,539
DATED : January 30, 1990
INVENTOR(S) : Masoud Salyani, et al It is certified that error appears in the above-identified patent and that said Letters Patent is hereby corrected as shown below:

In column 12, line 6 [claim 8, line 21]: delete "therein" and substitute -- thereon --.

Signed and Sealed this

First Day of January, 1991

*Attest:*

HARRY F. MANBECK, JR.

*Attesting Officer*  *Commissioner of Patents and Trademarks*